(No Model.)
J. PHEGLEY.
CHURN.
No. 492,945. Patented Mar. 7, 1893.
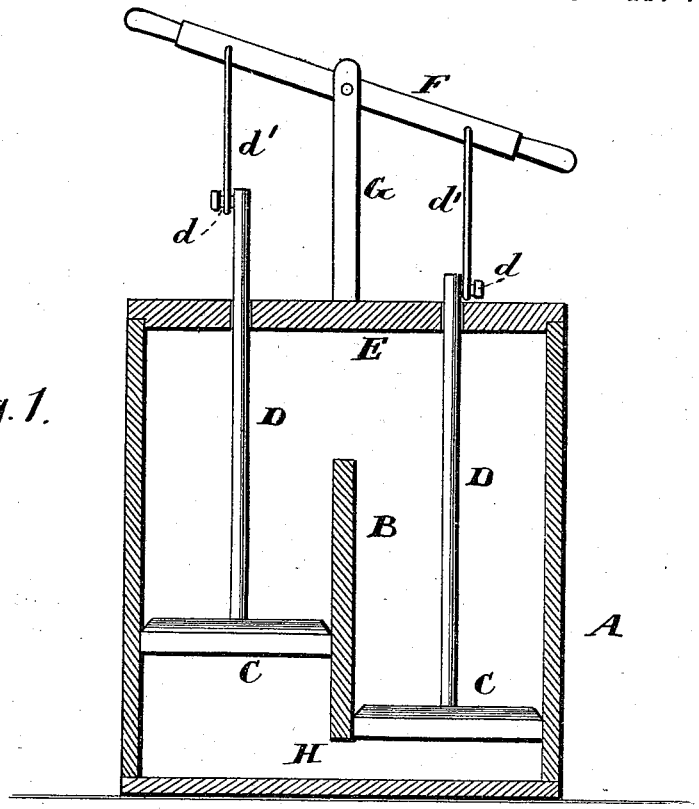
Fig. 1.
Fig. 2.
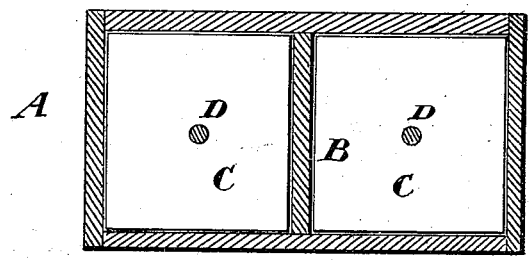
Witnesses
A. Ruppert
H. A. Daniels
Inventor
James Phegley
Per
Thomas P. Simpson
Attorney

UNITED STATES PATENT OFFICE.

JAMES PHEGLEY, OF HARRISBURG, OREGON.

CHURN.

SPECIFICATION forming part of Letters Patent No. 492,945, dated March 7, 1893.

Application filed September 22, 1892. Serial No. 446,560. (No model.)

*To all whom it may concern:*

Be it known that I, JAMES PHEGLEY, a citizen of the United States of America, residing at Harrisburg, in the county of Linn and State of Oregon, have invented certain new and useful Improvements in Churns, of which the following is a specification, reference being had therein to the accompanying drawings.

The invention relates to that class of churns wherein are arranged two dashers, with a partition between them, and operated by a two-handled lever fulcrumed on top of the churn.

The special object is to overcome certain objections to the churn for which a patent was granted to Isaac Lantz September 22, 1885; numbered 326,751. His dashers went down upon a false bottom while mine only extend to a bottom-slot in the partition; his forces the cream through side-apertures all the way up the sides of the partition and over the dashers which is very objectionable as it has to be lifted; my dashers force all the milk under the partition so that none ever gets above the dashers, while the pressure of one dasher upon the milk raises the other dasher. Hence my churn operates much more easily, with less labor and will bring more butter from the same quantity of cream.

Figure 1 of the drawings is a vertical section, and Fig. 2 a horizontal section of the churn.

In the drawings, A represents the body of churn divided by a partition B into two parts, preferably of equal size, and each provided with a dasher C of any suitable form, without any valve or opening of any kind and working tightly. The dasher rods D pass through the churn cover E, which may be made tight in any approved manner, and are provided with a right-angle or arm $d$ at the upper end, said arm serving as a stop to gage the extent of the down stroke of the dasher and prevent it from going below the bottom of the partition B. The arms $d$ $d$ are connected by rods $d'$ with the lever F fulcrumed at its middle on an upright G which is arranged in the same vertical plane as the partition B.

H is the opening through which the milk passes back and forth from one chamber to the other so that the milk is always under the dashers.

What I claim as new, and desire to protect by Letters Patent, is—

The churn body A having a partition B with openings above and below it, in combination with the solid dashers C C working fluid-tight, dasher-rods D having at the upper ends the side-studs $d$ to prevent the dashers from going above or below said partition and a lever F connected with said studs by equal pivoted rods at an equal distance from the fulcrum of the lever as shown and described.

In testimony whereof I affix my signature in presence of two witnesses.

JAMES PHEGLEY.

Witnesses:
S. E. BRYANT,
W. W. BRIGGS.